United States Patent [19]

Garner et al.

[11] Patent Number: 5,366,004
[45] Date of Patent: Nov. 22, 1994

[54] BIOSTATIC/BIOCIDAL COATINGS FOR AIR CONDITIONER CORES

[75] Inventors: David P. Garner, Sterling Heights; Robert A. Ottaviani, Washington; Dexter D. Snyder, Birmingham; James H. Lindsay, Fenton; June-Sang Siak, Troy; Richard M. Schreck, Bloomfield Hills, all of Mich.

[73] Assignee: General Motors Corporation, Detroit, Mich.

[21] Appl. No.: 205,752

[22] Filed: Mar. 4, 1994

Related U.S. Application Data

[63] Continuation of Ser. No. 892,429, Jun. 1, 1992, abandoned, which is a continuation of Ser. No. 753,244, Aug. 30, 1991, abandoned.

[51] Int. Cl.⁵ .................................................. F28F 19/02
[52] U.S. Cl. ...................................... 165/133; 165/134.1
[58] Field of Search .................................. 165/133, 134.1

[56] References Cited

U.S. PATENT DOCUMENTS

| | | | |
|---|---|---|---|
| 2,476,372 | 7/1949 | Heiks | 106/18.36 |
| 3,615,744 | 10/1971 | Yokoo et al. | 106/15.05 |
| 3,809,155 | 5/1974 | Anthony et al. | 165/133 |
| 4,052,354 | 10/1977 | Beiter et al. | 106/18.36 |
| 4,314,850 | 2/1982 | Watanabe et al. | 106/15.05 |
| 4,412,869 | 11/1983 | Vernam et al. | 148/2 |
| 4,470,455 | 9/1984 | Sacca | 165/167 |
| 4,531,980 | 7/1985 | Miura et al. | 148/11.5 C |
| 4,674,566 | 6/1987 | Heine et al. | 165/134.1 |
| 4,830,101 | 5/1989 | Ohara et al. | 165/133 |
| 5,014,774 | 5/1991 | Siak et al. | 165/133 |

FOREIGN PATENT DOCUMENTS

| | | | |
|---|---|---|---|
| 3520313 | 1/1986 | Germany | 106/18.36 |
| 39-15429 | 8/1964 | Japan | 106/18.36 |
| 0953753 | 4/1964 | United Kingdom | 106/18.36 |

OTHER PUBLICATIONS

ASM, Metals Handbook, 9th Edition, vol. 5, "Surface . . . Coating", American Society for Metals, 1982, at sects. 601–606.

The New England Journal of Medicine, vol. 311, #25, Dec. 20, 1984, pp. 1619 to 1621.

*Primary Examiner*—Allen J. Flanigan
*Attorney, Agent, or Firm*—Lawrence B. Plant

[57] ABSTRACT

According to a preferred embodiment of this invention, the exterior surface of an evaporator carries a coating of dried paint resistant to microbial growth and suitable for forming an adhered layer on cooling surfaces of an air conditioner. This paint comprises a pigment, a liquid, a binder to promote formation and adherence of the coating after the paint is applied and dried, and a metallic constituent which inhibits microbial growth. Preferably, the metallic constituent is inorganic and includes one or more of: copper, cupric carbonate, cuptic hydroxide, cuptic oxide, cuprous oxide, silver, silver oxide, zinc oxide, and zinc peroxide. The coating is preferably applied to the integral core after assembling and brazing the several plates and fins of the core.

4 Claims, 2 Drawing Sheets

BIOSTATIC/BIOCIDAL COATINGS FOR AIR CONDITIONER CORES

This is a continuation of application Ser. No. 07/892,429 filed on Jun. 1, 1992, abandoned which is a continuation of application Ser. No. 07/753,244 filed Aug. 30, 1991, abandoned.

FIELD OF THE INVENTION

This invention relates to an aluminum evaporator core for an automotive air conditioning system and, more particularly, to such core having an inorganic metallic coating to inhibit microbial growth.

BACKGROUND OF THE INVENTION

In a typical automotive air conditioning system, refrigerant is circulated through an evaporator core located at the front of the passenger compartment to cool air en route to the compartment. The evaporator core has a plate-and-fin construction formed of a stack of elements individually stamped from aluminum alloy sheet stock and brazed into an integral structure. Aluminum alloy is preferred because it has low specific gravity and high thermal transfer properties, and also because the evaporator may be fashioned from readily available sheet stock by convenient operations such as stamping and brazing.

The plate-and-fin design of the evaporator core provides numerous air passages for maximum contact with heat exchanger surfaces. During air conditioning operation, moisture condenses within the air passages of the evaporator core and promote the growth of microorganisms, which, if excessive, may produce an unpleasant odor or otherwise affect passenger comfort. U.S. Ser. No. 360,681, assigned to the assignee of the present invention, describes an aluminum evaporator core coated with a metallic copper plate to inhibit microbial growth. Condensate collecting in the air passages tends to be slightly acidic and reacts with the copper to produce cupric ions. The cupric ionst in turn, dissolve in the condensate and inhibit biological growth. A potential corrosion problem arises where the substrate aluminum comes in physical and/or electrical contact with the copper plate.

U.S. Ser. No. 07/572,649 assigned to the assignee of the present invention, describes an evaporator core further comprising a biocidal fixture attached to the heat exchanger upstream face. The fixture comprises a carrier formed of an electrically nonconductive polymer and a metallic copper plate deposited on the surface of the carrier spaced apart from the heat exchanger. During air conditioning operations, condensate collecting on the copper surfaces reacts with the copper to generate cuptic ions that disperse in the condensate to inhibit biological growth within the heat exchanger passages. However, it is desirable to inhibit or resist growth of microorganisms without the need to attach a separate fixture to the core.

Therefore, it is desirable to have an improved evaporator core which is resistant to growth of microorganisms, and easy to use and economical; and a method for making such an improved evaporator core.

SUMMARY OF THE INVENTION

In accordance with a preferred embodiment, an automotive evaporator core formed of an aluminum alloy is provided with an exterior surface coating of a paint resistant to microbial growth and suitable for forming the coating on cooling surfaces of an air conditioner. The paint comprises: a pigment, a liquid, a binder to promote formation and adherence of the coating after the paint is applied and dried, and a metallic constituent which inhibits microbial growth. Preferably, the pigment is an inorganic mixture which includes the metallic constituent; the microbial resistant metallic constituent is essentially insoluble in water at a pH of 7 (neutral pH), and only slightly soluble at the pH of condensate produced by ambient conditions (at least slightly acidic).

Desirably, the metallic constituent consists essentially of at least one inorganic compound of a metal selected from the group consisting of copper, silver and zinc compounds, in an amount sufficient to provide at least about 2 percent by weight of the metal in the dried coating. Preferably, the dried coating contains about 5 percent to about 15 percent by weight of the metal.

Preferably, the metallic constituent consists essentially of at least one selected from the group consisting of: copper, cupric carbonate, cuptic hydroxide, cupric oxide, cuprous oxide, silver, silver oxide, zinc oxide, and zinc peroxide.

Advantageously, the paint of the invention is suitable for application by electro-deposition wherein the binder is an electro-deposition resin. Desirably, the pigment is an inorganic mixture which includes the metallic constituent and a ratio of the pigment to the binder (P/B) is at least about 0.2; preferably, about 0.2 to about 0.5.

Preferably, the paint is applied by first forming a mixture of: 1) the pigment which includes at least one metallic constituent resistant to microbial growth; 2) the liquid, and 3) the binder. Next, the mixture is applied onto the surfaces. Finally, the mixture is dried to provide an adhered coating on the surfaces with at least about 2 percent by weight of the metal to render the surfaces resistant to microbial growth.

Advantageously, condensation on the core reacts with the metallic constituent to provide the desired microbial resistant metallic ions, thus inhibiting microbial growth on the core. The amount of metal provided in the coating of paint is sufficient to generate biocidal ions over an extended period suitable for automotive component use.

These and other objects, features and advantages will become apparent from the following description of the preferred embodiments, appended claims and accompanying drawings.

BRIEF DESCRIPTION OF DRAWINGS

The present invention will be further illustrated with reference to the accompanying figures wherein.

DETAILED DESCRIPTION OF THE PREFERRED EMBODIMENTS

Figure 1:
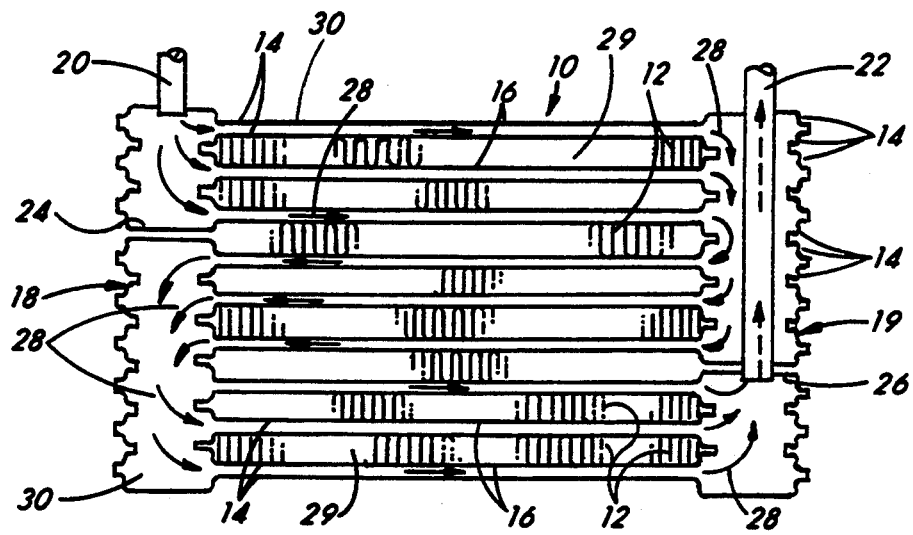
FIG. 1 is a front elevation schematic view of an automotive air conditioning evaporator core of the kind improved by the present invention.
Figure 2:
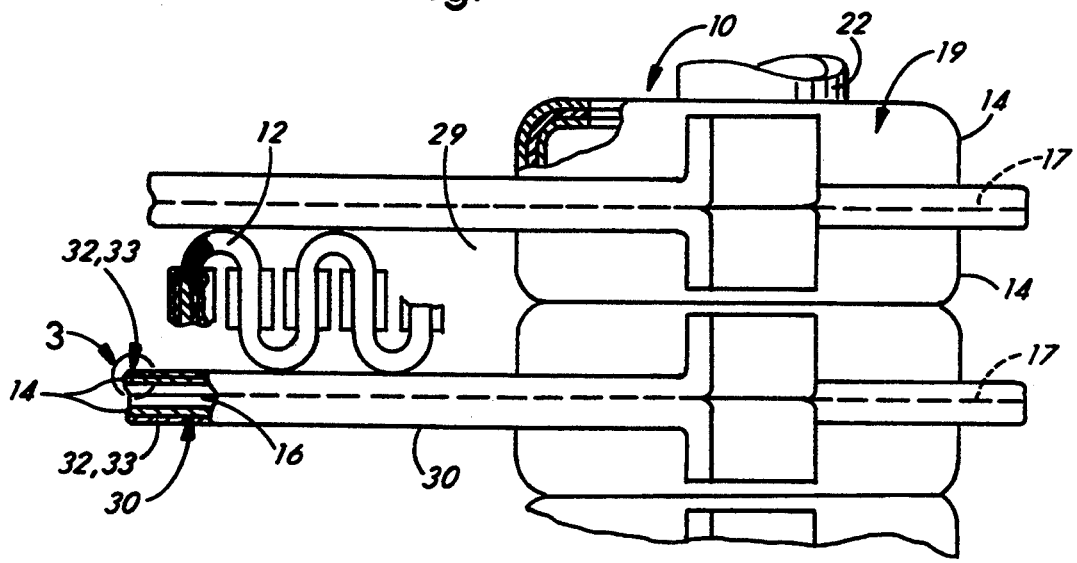
FIG. 2 is a cross-sectional view of a portion of the evaporator core of FIG. 1.
Figure 3:
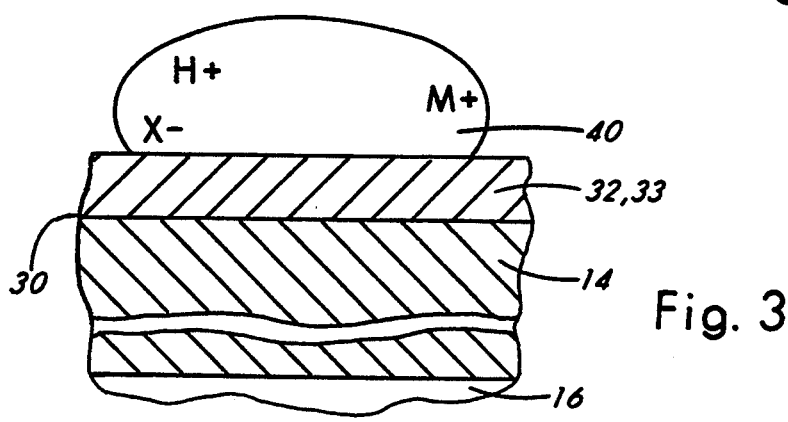
FIG. 3 is an enlarged cross-sectional view of a portion of the biocidal coating of this invention on the evaporator core of FIGS. 1 and 2.

Referring to FIGS. 1-3, a motor vehicle air conditioning system evaporator 10 comprises convoluted, louvered, metal fins 12 interposed between pairs of stamped sheet metal plates 14. The fins 12 and plates 14 are formed of an aluminum alloy having high thermal transfer properties. The fins 12 and plates 14 are individually stamped from sheet stock and assembled into the desired arrangement, whereafter the fins 12 and plates 14 are brazed or soldered into an integral structure. More particularly, plates 14 are hermetically sealed by parametric joints 17 to define a plurality of parallel passes 16 and end manifolds 18 and 19 in interconnecting relationship. An inlet tube 20 is connected to manifold 18 for introducing refrigerant in a cooled state into evaporator 10. Evaporator 10 further comprises an outlet tube 22 connected through a manifold 19 for withdrawing spent refrigerant. Baffles 24 and 26 are strategically located in manifolds 18 and 19 for directing refrigerant flow through evaporator 10 along a tortuous path indicated by arrows 28.

During air conditioning operation, refrigerant flowing through passes 16 cools air blowing between and through the interplate passages 29 defined by plates 14 and fins 12. The cooling effect or heat transfer is facilitated by fins 12 that increase air contact with the primary cooling surfaces, that is, the exterior surfaces 30 of fins 12 and plates 14. Although cooling is achieved by fins 12 and plates 14, the exterior surfaces 30 of all other elements of the evaporator 10 are at least partially in contact with air, such as, manifolds 18, 19 and tubes 20 and 22. Thus, the reference to exterior surfaces 30 of evaporator 10 include all such surfaces in contact with air being cooled. The evaporator 10 is of a conventional fin-and-plate design like that disclosed in U.S. Pat. No. 4,470,455, assigned to the assignee of this invention and hereby incorporated by reference.

According to a preferred embodiment of this invention, the exterior surface 30 of evaporator 10 carries a coating 32 of dried paint 33 resistant to microbial growth and suitable for forming an adhered layer on cooling surfaces of an air conditioner. This paint comprises a pigment, a liquid, a binder to promote formation and adherence of the coating after the paint is applied and dried, and a metallic constituent which inhibits microbial growth. Preferably, the pigment is an inorganic mixture which includes the metallic constituent; the microbial resistant metallic constituent is essentially insoluble in water at a pH of 7 (neutral pH), and only slightly soluble at the pH of condensate produced by ambient conditions (at least slightly acidic).

Desirably, the metallic constituent comprises one or more inorganic metallic compounds of copper, silver or zinc in an amount sufficient to provide at least 2 percent by weight of the metal in the applied and dried coating 32 of paint 33. The constituent may simply comprise one or more of the metallic elements of copper, zinc or silver.

Preferably, the metallic constituent is inorganic and includes one or more of: copper, cuptic carbonate, cuptic hydroxide, cuptic oxide, cuprous oxide, silver, silver oxide, zinc oxide, and zinc peroxide.

The coating is preferably applied to the integral core 10 after assembling and brazing the several plates and fins. In a preferred method for applying the paint 33 of the invention, a mixture is formed of: 1) the pigment which includes at least one metallic constituent resistant to microbial growth; 2) the liquid; and 3) the binder. Next, the mixture is applied to cooling surfaces 30 of an air conditioner by electro-deposition (ELPO) and then dried to form the coating 32 of the paint 33 on the surfaces 30, where the coating 32 has at least 2 percent by weight of the metal resistant to microbial growth. Good results were achieved in the range of about 2 percent to about 15 percent by weight of metal in the applied, dried coating.

During the preferred electro-deposition process, a part is immersed in a bath of the paint 33 and then a potential is applied. The assorted ions migrate to the core 10 and are deposited on the surface 30. The deposition continues until either the potential is removed or sufficient amounts of resin and pigments are deposited so as to render the surface 30 nonconductive. Thus, by the choice of binder, pigment, and deposition conditions, the thickness of the coating 32 can be controlled.

During the electro-deposition process (ELPO) process conductivity, pH, and other bath characteristics are adjusted depending on the ELPO application technique. Preferably, the ELPO utilizes an organic electro-deposition resin. At high pigment to binder (P/B) ratios satisfactory bath conditions must be maintained. It has been determined that preferred pigment to binder ratio (P/B) is at least about 0.2; and good results are achieved in the range of about 0.2 to about 0.5.

Conveniently, the pigment may be formulated as a mixture which includes the metallic constituent, preferably as an inorganic metallic compound. Preferably, the overall composition of the pigment is inorganic.

EXAMPLE 1

The method of the invention was used to apply the paint resistant to microbial growth in an ELPO bath of approximately 80-85 percent by weight water and 15-20 percent by weight solid paint material. The pigment (inorganic component) to binder (polymer resin) ratio (P/B) for the resin was held at about 0.2-0.5. The resin contained ionic sites which helped to disperse the resin in the aqueous solution and were the active sites during the deposition process.

Biocidal and/or biostatic formulations using copper, copper oxide, and copper carbonate as shown in Table 1, were applied by an ELPO method. In this example, a commercial resin system obtained from PPG, Inc. (PPG) was used. It was a standard cationic PPG ELPO resin system consisting of a grinding resin, catalyst, and deposition resin, and is sold by PPG under the designation ED-11. Although PPG's ED-11 achieved good results, the choice of resin systems is not thought to be critical to the method of the invention.

The pigment to binder ratio (P/B) was derived based upon the formulations as presented in Table 1, based upon the dry weight of resin and the sum of all pigments. For example, for the 13 percent Copper Oxide formulation the P/B is: 2.3 grams lead cyanamide+7.7 grams silica+67.0 grams copper oxide=77.0 grams pigment. The binder is the dry weight resin which is 332.3 grams. Thus, the pigment to binder ratio (P/B) is 77.0/332.3 or 0.23. The pigment to binder ratio (P/B) for all formulations as shown in Table 1 are in the range from about 0.23 to about 0.45.

TABLE 1

| Formulation: | 2%<br>Copper Metal* | 13%<br>Copper Oxide* | 5%<br>Copper Carbonate* | 8.5%<br>Copper Carbonate* | 15%<br>Copper Carbonate* |
|---|---|---|---|---|---|
| Resins | 892.3 g | 892.3 g | 892.3 g | 892.3 g | 892.3 g |
| Dry Resin Weight | 332.3 g | 332.3 g | 332.3 g | 332.3 g | 332.3 g |
| DI Water | 1200.0 ml | 1200.0 ml | 1200.0 ml | 1200.0 ml | 1200.0 ml |
| TiO2 | 57.5 g | 0 g | 25.2 g | 0 g | 0 g |
| Carbon Black | 1.6 g | 0 g | 1.6 g | 0 g | 0 g |
| Lead Cyanamide | 2.3 g | 2.3 g | 2.3 g | 2.3 g | 2.3 g |
| Silica | 7.7 g | 7.7 g | 7.7 g | 7.7 g | 7.7 g |
| Copper Compound | 8.1 g | 67.0 g | 40.3 g | 67.0 g | 140.8 g |

*Percent by weight copper in dry coating
DI Refers to deionized water

In order to prepare the core surface for the ELPO process, the core was dipped into an agitated water bath containing a surfactant. A water based cleaner was used to remove dirt and/or grease from the core. This dip was followed by two rinses with deionized water to remove all traces of the surfactant. The core was then blown dry to remove excess water before immersion in an ELPO bath.

The ELPO was applied to aluminum panels by immersing the panels into the bath and applying a potential to the panels. Potentials of 75 to 220 volts were used and deposition times varied. The panels were then removed from the bath and baked at 300 degrees to 350 degrees centigrade until cured.

The percentage copper in the dry film was about the same regardless of film thickness and the percentage copper for each formulation is given in Table 1. Thus, the designation 5 percent Copper Carbonate actually contained 5 percent copper by weight in the dry film. The important parameter was the total amount of copper in the coating to insure sufficient biocidal activity for the service life of the core. The amount of copper in the coating was easily determined by calculation. It should be noted that the quantities in Table 1 are for small parts. Large cores may require about four times the amounts of Table 1, while the relative proportions of the formulation remain the same.

Figure 4:
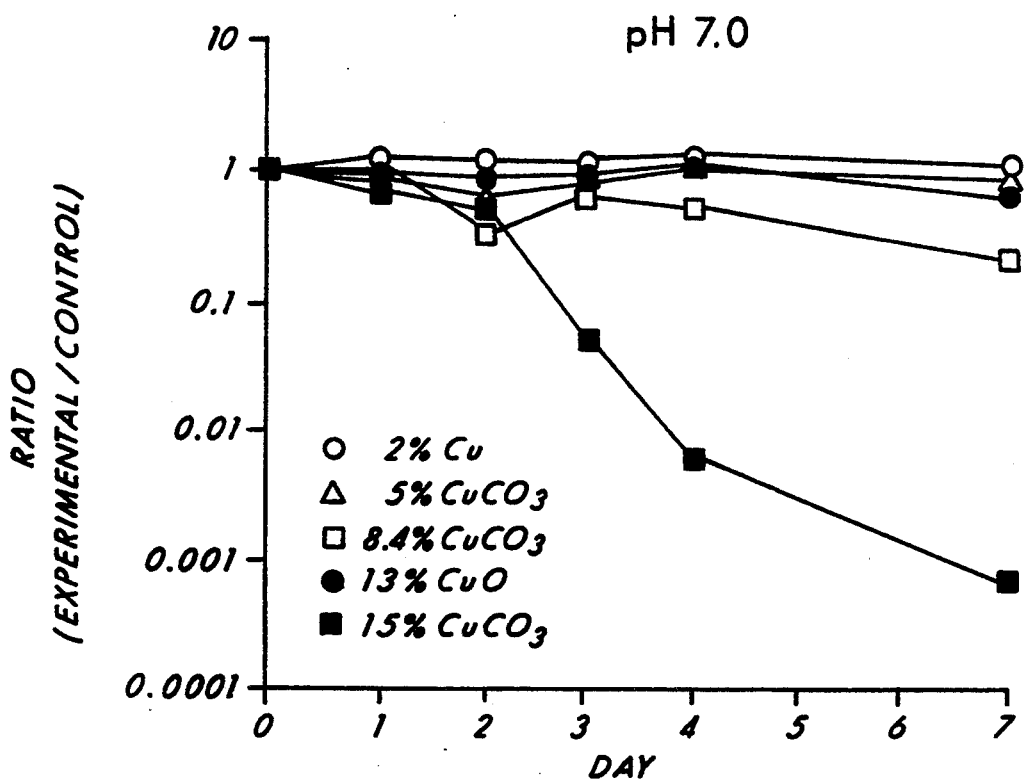
FIG. 4 is a diagram showing microbial growth in neutral pH as a function of time, where growth is expressed as a ratio relative to a control.
Figure 5:
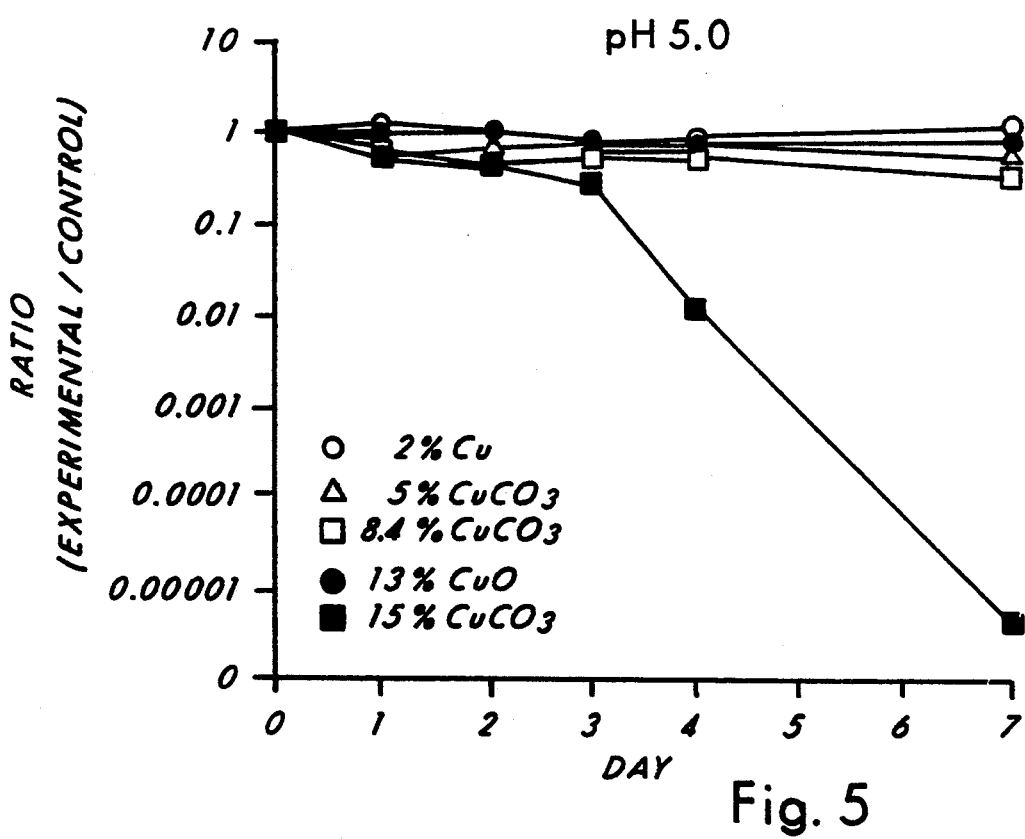
FIG. 5 is another diagram showing microbial growth in an acidic environment as a function of time, where growth is expressed as a ratio relative to a control.

Single, square centimeter coupons were cut from each coated panel and used to test for biological activity. As shown in FIG. 4, all ELPO formulations exhibited biostatic activity at pH 7.0. There was no increase in the bacterial population after seven days. The 15 percent CuCO3 formulation was biocidal as well as biostatic and the bacteria population was reduced by a factor of one thousand. The results were more pronounced when a slightly acid (5.0 pH) growing medium was used as shown in FIG. 5. Again, no bacterial growth was seen for the various formulations. The 15 percent CuCO3 formulation reduced bacteria count by a factor of one-hundred thousand, and was biocidal.

The results as shown in FIGS. 4 and 5 confirmed our earlier studies of the microbial resistance of copper, zinc and silver, and some salts thereof. Advantageously, these metals exhibit low toxicity to humans. Copper is an attractive choice because it is readily available and economical.

In use, moisture in the air cooled by evaporator 10 condenses onto the exterior surface 30 of core 10. While not limited to any particular theory, it is believed that under slightly acidic conditions, the microbial resistant metallic constituent is slightly soluble, and dissolves into condensate. Referring to FIG. 3, there is shown a water bead 40 condensed on the surface of evaporator plate 14 and containing hydrogen ions H+ in combination with cation X−. The cations may include airborne species such as sulfates, nitrogen oxides and sulfur dioxides, or organic species such as acetate, succinate and citrate produced by microbial growth on the evaporator surface 30. In any event, it is believed that hydrogen ions react with a metal, such as copper, zinc and/or silver, to form positive ions M+, which are in turn effective to inhibit growth of odor-producing microorganisms such as bacteria on the evaporator surface. Eventually, metal salts are removed in condensate drained from the surface to prevent buildup on the surface 30 of evaporator core 10. Thereafter, fresh condensate collecting on the coating 32 of paint 33 produces additional biocidal ions M+. The attack of coating 32 by the dilute acid is sufficiently slow to allow metal ions M+ to be generated in this manner over an extended time.

The thickness of the coating 32 of paint 33 may be increased to further extend the biocidal effect of the paint of this invention. While the biocidal coating 32 of paint 33 of this invention may be suitably applied to a selected region of an evaporator core 10 or to evaporator component surface 30 prior to assembly or brazing, it is preferred to apply the coating 32 to the brazed structure. Artionic formulations may be used as well as the cationic formation described above. Paints containing microbial resistant biostatic/biocidal pigments can also be applied by dip or spray using either water or organic solvent systems.

The coating of this invention is suitable for non-automotive air conditioning evaporator cores, such as are used for buildings, so as to inhibit microbial growth and improve treated air quality.

Advantageously, the coating of the invention is economical, easy to apply and able to be applied by a variety of processes. Further, the coating of paint of the invention achieves resistance to microbial growth without being dependent on critical control of composition and application process.

While this invention has been disclosed principally in terms of a particular embodiment, it is not intended to be limited to that embodiment, but rather only to the extent set forth in the following claims.

The embodiments of the invention in which an exclusive property or privilege is claimed are defined as follows:

1. An air conditioning evaporator of brazed aluminum alloy fin and plate construction in which a plurality of said plates define an internal refrigerant flow passage and a plurality of said fins together with said plates also define an external surface in heat exchange relationship with said refrigerant passage, whereby in the operation of said evaporator moisture-containing air flows over said external surfaces and is cooled and dehumidified by the condensation of water from said air onto said external surface, said evaporator further comprising a coating applied directly to at least a portion of said external surface, said coating consisting essentially of a thermoset binder resin having dispersed therein particles of a microbial growth inhibitor precursor selected from the group consisting of oxygen-containing inorganic compounds of copper, silver and zinc, said inhibitor particles being substantially insoluble in water at a pH of 7 but soluble in acidic aqueous condensate forming on said evaporator surface to function in said dissolved form as said inhibitor.

2. An air conditioning evaporator core according to claim 1, wherein the particles are selected from the group consisting of cupric carbonate, cupric hydroxide, cupric oxide, cuprous oxide, silver oxide, zinc oxide, and zinc peroxide.

3. An air conditioning evaporator core according to claim 1, wherein the weight ratio of the particles to the binder is in the range of about 0.2 to about 0.5.

4. An air conditioning evaporator of brazed aluminum alloy fin and plate construction in which a plurality of said plates define an internal refrigerant flow passage and a plurality of said fins together with said plates also define an external surface in heat exchange relationship with said refrigerant passage, whereby in the operation of said evaporator moisture-containing air flows over said external surfaces and is cooled and dehumidified by the condensation of water from said air onto said external surface, said evaporator further comprising a coating applied directly to at least a portion of said external surface, said coating consisting essentially of a thermoset binder resin having dispersed therein particles of a microbial growth inhibitor precursor selected from the group consisting of cupric carbonate, cupric hydroxide, cupric oxide and cuprous oxide, said inhibitor particles being substantially insoluble in water at a pH of 7 but being slightly soluble in the aqueous condensate forming on said evaporator surface to function in said dissolved form as said microbial growth inhibitor.

* * * * *